United States Patent

Friedrich et al.

Patent Number: 5,773,535
Date of Patent: Jun. 30, 1998

[54] ZIEGLER-NATTA CATALYST SYSTEMS CONTAINING SPECIFIC ORGANOSILICON COMPOUNDS

[75] Inventors: Holger Friedrich, Bobenheim-Roxheim; Stephan Hüffer, Ludwigshafen; Roland Hingmann, Ladenburg, all of Germany

[73] Assignee: BASF Aktiengesellschaft, Ludwigshafen, Germany

[21] Appl. No.: 814,798

[22] Filed: Mar. 10, 1997

[30] Foreign Application Priority Data

Mar. 14, 1996 [DE] Germany .................. 196 09 952.8

[51] Int. Cl.[6] .................................................. C08F 4/656
[52] U.S. Cl. .................................. 526/124.6; 526/125.3; 526/351; 502/116; 502/118; 502/120
[58] Field of Search ................................ 502/116, 118, 502/120; 526/124.6, 125.3

[56] References Cited

U.S. PATENT DOCUMENTS 4,857,613  8/1989  Zolk et al. .............................. 526/128

FOREIGN PATENT DOCUMENTS

| 14 523 | 8/1801 | European Pat. Off. . |
|---|---|---|
| 23 425 | 2/1981 | European Pat. Off. . |
| 45 975 | 2/1982 | European Pat. Off. . |
| 45 977 | 2/1982 | European Pat. Off. . |
| 86 473 | 8/1983 | European Pat. Off. . |
| 171 200 | 2/1986 | European Pat. Off. . |
| 195 497 | 9/1986 | European Pat. Off. . |
| 250 229 | 12/1987 | European Pat. Off. . |
| 0737688 | 10/1996 | European Pat. Off. . |
| 2 111 066 | 6/1983 | United Kingdom . |
| 93/23440 | 11/1993 | WIPO . |

*Primary Examiner*—Mark Nagumo
*Attorney, Agent, or Firm*—Keil & Weinkauf

[57] ABSTRACT

Catalyst systems of the Ziegler-Natta type comprising as active constituents a) a titanium-containing solid component prepared using a titanium compound, a compound of magnesium, a halogenating agent and an electron donor component, b) an aluminum compound and c) as further electron donor component, an organosilicon compound of the formula (I)

$$R^1R^2\text{si}(OR^3)_2 \qquad (I)$$

in which $R^1$ is a $C_1$–$C_{10}$-alkyl radical or a $C_3$–$C_8$-cycloalkyl radical, $R^2$ is a 2,4,4,6,6-pentamethylheptyl radical and $R^3$ is a $C_1$–$C_8$-alkyl radical, are particularly suitable for the preparation of polymers of $C_2$–$C_{10}$-alk-1-enes.

9 Claims, No Drawings

ZIEGLER-NATTA CATALYST SYSTEMS CONTAINING SPECIFIC ORGANOSILICON COMPOUNDS

The present invention relates to novel catalyst systems of the Ziegler-Natta type comprising as active constituents
a) a titanium-containing solid component prepared using a titanium compound, a compound of magnesium, a halogenating agent and an electron donor component,
b) an aluminum compound and
c) as further electron donor component, an organosilicon compound of the general formula (I)

$$R^1R^2Si(OR^3)_2 \quad (I)$$

where
$R^1$ is a $C_1$–$C_{10}$-alkyl radical or a $C_3$–$C_8$-cycloalkyl radical,
$R^2$ is a 2,4,4,6,6-pentamethylheptyl radical and
$R^3$ is a $C_1$–$C_8$-alkyl radical.

In addition, the invention relates to the preparation of polymers of $C_2$–$C_{10}$-alk-1-enes by means of these catalyst systems, the polymers obtainable in this way and also films, fibers and moldings comprising these polymers.

Catalyst systems of the Ziegler-Natta type are known, for example, from EP-B 14523, EP-A-23425, EP-A 45 975, EP-A 195 497, EP-A 250 229 and U.S. Pat. No. 4,857,613. These systems are used, in particular, for the polymerization of alk-1-enes and contain, inter alia, compounds of polyvalent titanium, aluminum halides and/or alkyls, and also electron donor compounds, for example silicon compounds, ethers, carboxylic esters, ketones and lactones which are used, on the one hand, in connection with the titanium compound and on the other hand as cocatalyst.

To ensure economical production of polyalk-1-enes, such catalyst systems must have, inter alia, a high productivity. This means the ratio of the amount of polymer formed to the amount of catalyst used. It is also necessary for the polymers obtainable in this way to be very stereospecific, ie. the proportion of non-isotactic molecular structures in homopolymers should not exceed from 2.0 to 3.0%. The xylene-soluble proportion is reported as a measure of the stereospecificity. The xylene-soluble proportion corresponds to the non-isotactic molecular structures.

These two objectives can be realized together only to a limited extent according to the prior art. Thus, for example, EP-A 86 473 discloses a catalyst system in which the electron donor compounds used within the titanium-containing solid component are carboxylic esters and the further electron donor compounds used are generally organosilicon compounds. Although this catalyst system has a satisfactorily high productivity, the stereospecificity of the polymers formed leaves something to be desired. Furthermore, EP-A 171 200 describes a Ziegler-Natta catalyst system in which the constituents of the titanium-containing solid component include carboxylic esters and the further electron donor compounds used are generally organosilicon compounds. These catalyst systems make possible, inter alia, the preparation of polypropylene having a high stereospecificity, but they do not give a satisfactorily high productivity.

Apart from these properties which are particularly important for the processing of the polymers, a low halogen content in the polyalk-1-ene is also important to make possible the use of such materials in connection with materials which may be subject to corrosion. For this purpose, it is necessary, in particular, to significantly reduce the halogen content in the polymer. Furthermore, it is important for processing reasons that polyalk-1-enes have good morphological properties, in particular a very low proportion of fines.

It is an object of the present invention to develop an improved catalyst system by means of which the disadvantages indicated above can largely be remedied and which makes it possible to prepare, with high productivity, polymers of $C_2$–$C_{10}$-alk-1-enes which have high stereospecificity, good morphological properties and a very low halogen content.

We have found that this object is achieved by the novel catalyst systems indicated in the claims.

To prepare the titanium-containing solid component a), the titanium compounds used as generally halides or alkoxides of trivalent or tetravalent titanium, with preference being given to the chlorides of titanium, in particular titanium tetrachloride.

Advantageously, the titanium-containing solid component also contains a finely divided support for which purpose silicon and aluminum oxides, and also aluminum silicates of the overall formula $SiO_2 \cdot aAl_2O_3$, where a is from 0.001 to 2, in particular from 0.01 to 0.5, have been found to be useful.

The supports preferably used have a particle diameter of from 0.1 to 1000 μm, in particular from 10 to 300 μm, a pore volume of from 0.1 to 10 cm³/g, in particular from 1.0 to 5.0 cm³/g, a mean pore diameter of from 50 to 1000 Å, in particular from 100 to 400 Å, and a specific surface area of from 10 to 1000 m²/g, in particular from 100 to 500 m²/g. The support particles can be used in granular form or spray dried in microscopic form.

Compounds of magnesium are also used, inter alia, in the preparation of the titanium-containing solid component a). Suitable magnesium compounds are magnesium halides, magnesium aryls, magnesium alkyls and magnesium alkoxy or magnesium aryloxy compounds, with particular preference being given to using magnesium dichloride, magnesium dibromide and magnesium di(C1–C10-alkyl) compounds. In addition, a halogenating agent, preferably chlorine, hydrogen chloride, bromine or hydrogen bromide, is also used in the preparation of this component.

Apart from the trivalent or tetravalent titanium compounds, and also the support if desired, the magnesium compound and the halogenating agent, use is also made in the preparation of the titanium-containing solid component a) of electron donor components, for example monofunctional or polyfunctional carboxylic acids, carboxylic anhydrides and carboxylic esters, ketones, ethers, alcohols, lactones, or organophosphorus and organosilicon compounds.

Preferred electron donor components within the titanium-containing solid component a) are, for example, diesters of 3- or 4-membered, unsubstituted or substituted cycloalkyl-1,2-dicarboxylic acids, and also monoesters of unsubstituted or substituted benzophenone-2-carboxylic acids. The hydroxy compounds used for these esters are the alcohols customary in esterification reactions, for example $C_1$–$C_{15}$-alkanols, $C_5$–$C_7$-cycloalkanols which can in turn bear $C_1$–$C_{10}$-alkyl groups, also $C_6$–$C_{10}$-phenols.

Further preferred electron donor components used within the titanium-containing solid component are, for example, phthalic acid derivatives of the formula II,

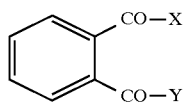

where X and Y are each chlorine or a $C_1$–$C_{10}$-alkoxy radical, in particular a $C_1$–$C_4$-alkoxy radical, or together are oxygen.

The titanium-containing solid component can be prepared by methods known per se. Examples are described, inter alia, in EP-A 45 975, EP-A 45 977, EP-A 86 473, EP-A 171 200, GB-A 2 111 066 and U.S. Pat. No. 4,857,613.

In the preparation of the titanium-containing solid component a), preference is given to using the following 3-stage process.

In the first stage, a finely divided support, preferably silicon oxide or $SiO_2 \cdot aAl_2O_3$, where a is from 0.001 to 2, in particular from 0.01 to 0.5, is first admixed with a solution of a magnesium-containing compound in a liquid alkane, after which this mixture is stirred for from 0.5 to 5 hours at from 10 to 120° C. Preference is given to using from 0.1 to 1 mol of the magnesium compound per mol of the support. Subsequently, a halogen or a hydrogen halide, in particular chlorine or hydrogen chloride, is added while stirring continuously in an at least 2-fold, preferably at least 5-fold, molar excess, based on the magnesium-containing compound.

A $C_1$–$C_8$-alkanol, in particular ethanol, a halide or an alkoxide of trivalent or tetravalent titanium, in particular titanium tetrachloride, and also an electron donor compound, in particular a phthalic acid derivative of the formula (II), are then added. From 1 to 5 mol, in particular from 2 to 4 mol, of alkanol, from 2 to 20 mol, in particular from 4 to 10 mol, of the trivalent or tetravalent titanium and from 0.01 to 1 mol, in particular from 0.1 to 1.0 mol, of the electron donor compound are here used per mol of magnesium of the solid obtained from the first stage. The solution is stirred for at least 20 minutes at from 10° to 150° C., the solid thus obtained is subsequently filtered off and washed with a liquid alkane, preferably hexane or heptane. The extraction can also be carried out using ethylbenzene and titanium tetrachloride.

Suitable aluminum components b) are trialkylaluminum compounds whose substituents each have from 1 to 8 carbon atoms and also such compounds in which an alkyl substituent has been replaced by an alkoxy group or by a halogen atom, for example by a chlorine or bromine atom. Preference is given to using trialkylaluminum compounds whose alkyl groups each have 1–8 carbon atoms, for example trimethylaluminum, triethylaluminum or methyldiethylaluminum.

According to the present invention, the further electron donor component c) used is an organosilicon compound of the general formula (I)

$$R^1R^2Si(OR^3)_2 \qquad (I)$$

where
$R^1$ is a $C_1$–$C_{10}$-alkyl radical or a $C_3$-$C_8$-cycloalkyl radical,
$R^2$ is a 2,4,4,6,6-pentamethylheptyl radical and
$R^3$ is a $C_1$–$C_8$-alkyl radical.

Preference is given to using organosilicon compounds of the formula (I) in which $R^1$ is a branched $C_3$–$C_8$-alkyl radical, in particular a branched $C_3$–$C_6$-alkyl radical or a $C_4$–$C_6$-cycloalkyl radical, and $R^3$ is a $C_1$–$C_6$-alkyl radical, in particular a $C_1$–$C_4$-alkyl radical. In particularly preferred organosilicon compounds, $R^1$ is an isobutyl, sec-butyl, tert-butyl or isopropyl radical.

Among these compounds, particular mention should be made of
dimethoxy(2,4,4,6,6-pentamethylheptyl)sec-butylsilane,
diethoxy(2,4,4,6,6-pentamethylheptyl)sec-butylsilane,
dimethoxy(2,4,4,6,6-pentamethylheptyl)isopropylsilane,
diethoxy(2,4,4,6,6-pentamethylheptyl)isopropylsilane,
dimethoxy(2,4,4,6,6-pentamethylheptyl)tert-butylsilane,
diethoxy(2,4,4,6,6-pentamethylheptyl)tert-butylsilane,
dimethoxy(2,4,4,6,6-pentamethylheptyl)isobutylsilane,
diethoxy(2,4,4,6,6-pentamethylheptyl)isobutylsilane,
dimethoxy(2,4,4,6,6-pentamethylheptyl)cyclopentylsilane,
dimethoxy(2,4,4,6,6-pentamethylheptyl)cyclohexylsilane,
diethoxy(2,4,4,6,6-pentamethylheptyl)cyclopentylsilane and
diethoxy(2,4,4,6,6-pentamethylheptyl)cyclohexylsilane.

The preparation of such specific silanes is usually carried out by known methods, which are described, inter alia, in DE-A 1 95 14 258.

Preference is given to using catalyst systems in which the atom ratio between aluminum from the aluminum compound b) and titanium from the titanium-containing solid component a) is from 10:1 to 800:1, in particular from 20:1 to 200:1, and the molar ratio between the aluminum compound b) and the electron donor compound c) used according to the present invention is from 1:1 to 100:1, in particular from 2:1 to 80:1. The catalyst constituents can be introduced into the polymerization system in any order, individually or as a mixture of the components.

The catalyst system of the present invention is particularly suitable for the polymerization of $C_2$–$C_{10}$-alk-1-enes. In this context, $C_2$–$C_{10}$-alk-1-enes are, in particular, ethylene, propylene, but-1-ene, pent-1-ene, hex-1-ene, hept-1-ene or oct-1-ene or mixtures of these $C_2$–$C_{10}$alk-1-enes, with preference being given to using propylene or but-1-ene as monomers. The catalyst system of the present invention is particularly well suited to the homopolymerization of propylene or the copolymerization of propylene with subordinate amounts of ethylene, but-1-ene, pent-1-ene, hex-1-ene or mixtures of these.

The preparation of polymers of $C_2$–$C_{10}$-alk-l-enes with the aid of the catalyst system of the present invention can be carried out in the conventional reactors used for the polymerization of propylene, either batchwise or preferably continuously, for example as a suspension polymerization or preferably as a gas-phase polymerization. Suitable reactors are, for example, continuously operated stirred reactors containing a fixed bed of finely divided polymer which is usually kept in motion by means of suitable stirring devices. Of course, the reaction can also be carried out in a plurality of reactors connected in series.

The polymerization reaction is advantageously carried out at from 20° to 150° C. and pressures of from 1 to 100 bar. Preference is given to temperatures of from 40° to 100° C. and pressures of from 10 to 50 bar. The mean residence times of the reaction mixture in the polymerization using the catalyst system of the present invention are usually in the range from 0.5 to 10 hours, in particular in the range from 1 to 5 hours. The molecular weight of the polyalk-1-enes formed can be controlled by addition of regulators customary in polymerization technology, for example hydrogen. Furthermore, it is possible to also use inert solvents such as toluene or hexane, or inert gases such as nitrogen or argon.

The mean molecular weights of the polymers prepared by means of the catalyst system of the present invention are from 10,000 to 1,000,000, the melt flow indices are from 0.1 to 100 g/10 min, preferably from 0.2 to 50 g/10 min, in each case measured in accordance with DIN 53735 at 230° C. and 2.16 kg. The melt flow index corresponds to the amount of polymer which is forced out of the test apparatus standardized in accordance with DIN 53 735 over a period of 10 minutes at 230° C. and under a weight of 2.16 kg.

The catalyst system of the present invention has a high productivity, particularly in gas-phase polymerization. The polymers obtainable in this way have a very high stereospecificity, a low chlorine content and a very low proportion of fines (<0.125 mm). The polymers prepared using this catalyst system are particularly suitable for the production of films, fibers and moldings.

EXAMPLES

Example 1 a) Preparation of the Titanium-Containing Solid Component (1)

In a first stage, $SiO_2$ having a particle diameter of from 20 to 45 mm, a pore volume of 1.7 $cm^3/g$ and a specific surface area of 320 $m^2/g$ was admixed with a solution of n-butyloctylmagnesium in n-heptane, with 0.3 mol of the magnesium compound being used per mol of $SiO_2$. The solution was stirred for 30 minutes at 90° C., the cooled to 20° C., after which a 10-fold molar amount, based on the organomagnesium compound, of hydrogen chloride was passed in. After 90 minutes, the reaction product was admixed while stirring continuously with 3 mol of ethanol per mol of magnesium. This mixture was stirred for 30 minutes at 80° C. and subsequently admixed with 7.2 mol of titanium tetrachloride and 0.5 mol of di-n-butyl phthalate dissolved in ethylbenzene, in each case based on 1 mol of magnesium. The mixture was subsequently stirred for 1 hour at 100° C., the solid thus obtained was filtered off and washed a number of times with ethylbenzene.

The solid product thus obtained was extracted for 3 hours at 125° C. with a 10% strength by volume solution of titanium tetrachloride in ethylbenzene. The solid product was then separated from the extraction by filtration and washed with n-heptane until the extraction contained only 0.3% by weight of titanium tetrachloride.

The titanium-containing solid component contained 3.6% by weight of Ti
7.7% by weight of Mg
27.9% by weight of Cl.

b) Polymerization

A 10 l steel autoclave provided with a stirrer was charged at 30° C. with 50 g of polypropylene powder (melt flow index: 10 g/10 min, at 230° C. and 2.16 kg, in accordance with DIN 53735), 10 mmol of triethylaluminum (in the form of a 1-molar solution in n-heptane), 10 l of hydrogen, 93.2 mg of the titanium-containing solid component prepared as described in Example 1a) and 1 mmol of the silane compound indicated in the table below. The molar ratio of the aluminum component to the organic silane compound used according to the present invention was 10:1. The reactor temperature was subsequently increased to 70° C. over a period of 10 minutes, the reactor pressure was brought to 28 bar by injection of gaseous propylene, after which polymerization was carried out at a mean residence time of the reaction mixture of 1.5 hours. During this procedure, the monomer consumed was continuously replaced by fresh monomers.

The productivity of the catalyst system, which is defined as the ratio of the amount of polymer formed to the amount of titanium-containing solid component, the xylene-soluble proportion, which represents a measure of the proportion of non-isotactic structural units, the proportions of fines (>0.125 mm), the melt flow index and the chlorine content of the propylene homopolymer obtained are shown in the table below.

Example 2

Propylene was polymerized using the same catalyst system and under the reaction conditions described in Example 1, but dimethoxy(2,4,4,6,6-pentamethylheptyl)tert-butylsilane was now used in place of dimethoxy(2,4,4,6,6-pentamethylheptyl) isopropylsilane.

Comparative Example

Propylene was polymerized using the same catalyst system and under the reaction conditions described in Example 1, but triethoxytolylsilane was used as further electron donor component c) in place of the silane compound to be used according to the present invention.

The measured data on the propylene homopolymer obtained are shown in the table below.

TABLE

|  | Example 1 | Example 2 | Comparative example |
| --- | --- | --- | --- |
| Productivity (g of polypropylene/g of titanium-containing solid component) | 19500 | 20200 | 15600 |
| Xylene-soluble proportion (% by weight) | 1.3 | 1.1 | 2.1 |
| Proportion of fines* <0.125 mm (in %) | 0.1 | 0.2 | 0.2 |
| Chlorine content in the polymer (ppm) (ppm) | 14.5 | 14.0 | 18.0 |
| Melt flow index** (1 g/10 min) | 12.3 | 11.7 | 17.8 |
| Silane used | Dimethoxy(2,4,4,6,6-pentamethylheptyl)tert-butyl- | Dimethoxy(2,4,4,6,6-pentamethylheptyl)tert-butyl-silane | Triethoxytolylsilane |

*determined by sieve analysis
**at 230° C. and 2.16 kg, in accordance with DIN 53735

We claim:

1. A catalyst system of the Ziegler-Natta type comprising as active constituents a) a titanium-containing solid component prepared using a titanium compound, a compound of magnesium, a halogenating agent and an electron donor component, b) an aluminum compound and c) as further electron donor component, an organosilicon compound of the general formula (I)

$$R^1R^2Si(OR^3)_2 \qquad (I)$$

where $R^1$ is a $C_1$–$C_{10}$-alkyl radical or a $C_3$–$C_8$-cycloalkyl radical, $R^2$ is a 2,4,4,6,6-pentamethylheptyl radical and $R^3$ is a $C_1$–$C_8$-alkyl radical.

2. A catalyst system as defined in claim 1 in whose organosilicon compound c) $R^1$ is a branched non-cyclic $C_3$–$C_6$-alkyl radical and $R^3$ is a $C_1$–$C_6$-alkyl radical.

3. A catalyst system as defined in claim 1 in whose organosilicon compound (c) $R^1$ is a branched non-cyclic $C_3$–$C_6$-alkyl radical and $R^3$ is a $C_1$–$C_4$-alkyl radical.

4. A catalyst system as defined in claim 1 in whose organosilicon compound c) $R^1$ is an isobutyl, sec-butyl, tert-butyl or isopropyl radical.

5. A catalyst system as defined in claim 1, wherein the titanium-containing solid component a) comprises a finely divided support.

6. A catalyst system as defined in claim 1, wherein the electron donor component within the titanium-containing solid component a) is a phthalic acid derivative of the formula (II),

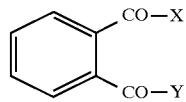

wherein X and Y are each chlorine or a $C_1$–$C_{10}$-alkoxy radical or together are oxygen.

7. A catalyst system as defined in claim 1, wherein the aluminum component b) is a trialkylaluminum compound whose substituents each have from 1 to 8 carbon atoms.

8. A process for preparing polymers of $C_2$–$C_{10}$alk-1-enes by polymerization at from 20° to 150° C., pressures from 1 to 100 bar and mean residence times of the reaction mixture of from 1 to 10 hours by means of a Ziegler-Natta catalyst system, wherein a catalyst system as defined in claim 1 is used.

9. A catalyst system as defined in claim 1, wherein $R^1$ is cyclopentyl or cyclohexyl.

* * * * *

UNITED STATES PATENT AND TRADEMARK OFFICE
CERTIFICATE OF CORRECTION

PATENT NO.: 5,773,535

DATED: June 30, 1998

INVENTOR(S): FRIEDRICH et al.

It is certified that error appears in the above-identified patent and that said Letters Patent is hereby corrected as shown below:

On the cover page, item [57], formula (I) should read as follows:
--$R^1R^2\underline{Si}(OR^3)_2$--.

Col. 7, claim 2, line 14, "$C_3$-$C_6$-alkyl" should be --$C_3$-$C_8$-alkyl--.

Signed and Sealed this

Twenty-ninth Day of September, 1998

*Attest:*

BRUCE LEHMAN

*Attesting Officer*  *Commissioner of Patents and Trademarks*